UNITED STATES PATENT OFFICE.

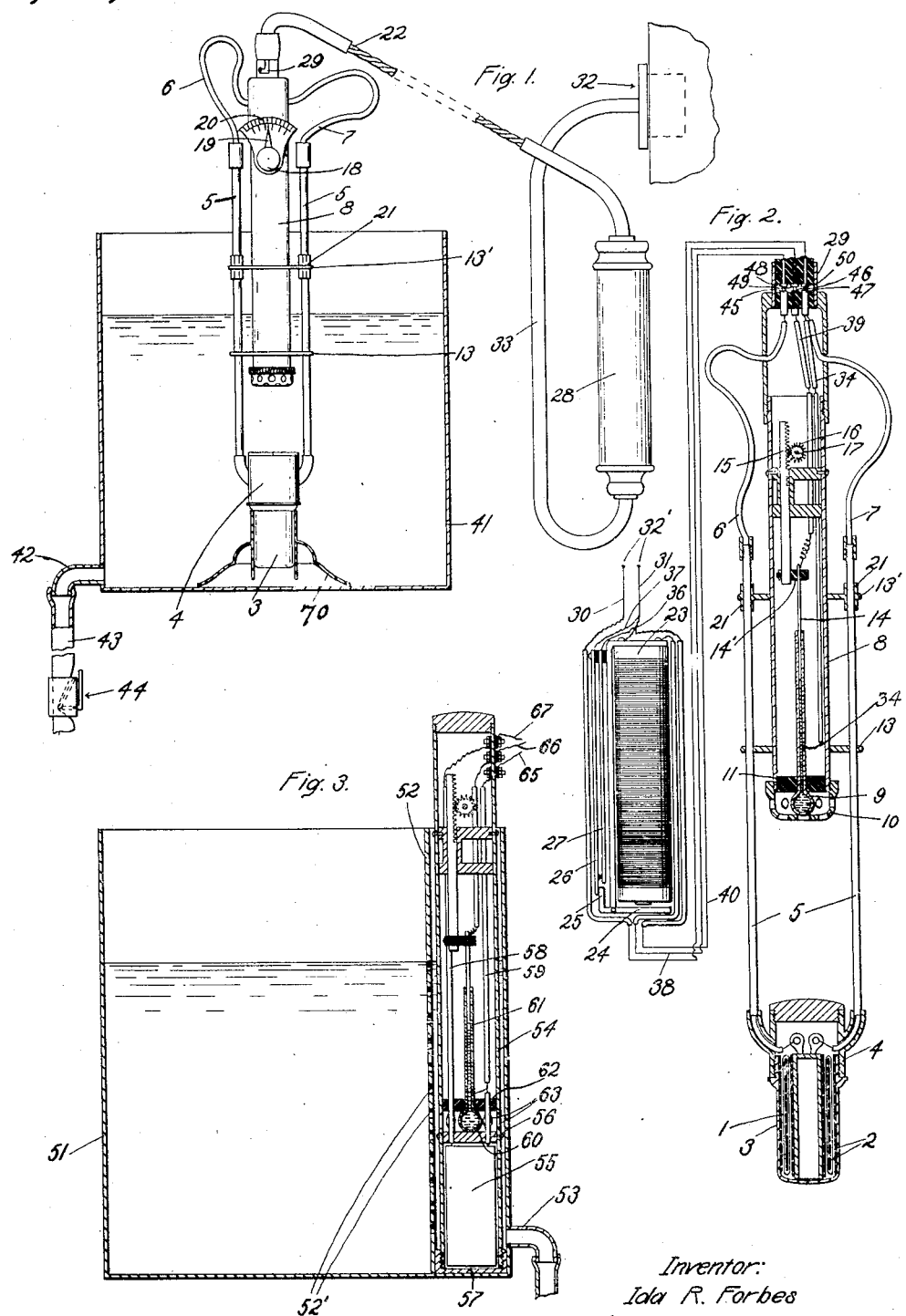

IDA R. FORBES, OF LOS ANGELES, CALIFORNIA.

ELECTRICAL WATER-HEATER.

1,251,210.  Specification of Letters Patent.  Patented Dec. 25, 1917.

Application filed June 24, 1916, Serial No. 105,562. Renewed July 16, 1917. Serial No. 180,939.

*To all whom it may concern:*

Be it known that I, IDA R. FORBES, a citizen of the United States, residing at Los Angeles, in the county of Los Angeles and State of California, have invented a new and useful Electrical Water-Heater, of which the following is a specification.

This invention relates to means for heating water for douches or for other purposes, and the main object of the invention is to provide means for heating the water to a definite temperature, and for variably controlling the temperature to which the water is to be heated.

Another object of the invention is to provide an automatically controlled water heating device which is portable so as to adapt it to various uses.

The accompanying drawings illustrate embodiments of my invention, and referring thereto:

Figure 1 is an elevation of the heating means and the controlling devices therefor, the water receptacle containing the heating device being shown in section.

Fig. 2 is a vertical section of the heating and controlling devices, with the electric connections shown diagrammatically.

Fig. 3 is a vertical section of another form of the invention.

Referring to Figs. 1 and 2, the invention comprises an electric heating element, an adjustable thermostatic circuit controller, and electromagnetic means controlled by said circuit controller and operating to control the circuit of said heating element. The heating element, indicated at 1, may be of any suitable type, consisting, for example, of resistance wire wound on an insulating support 2, which is mounted within a casing 3 closed in such manner as to be watertight. A casing member 4 screws on casing 3, and serves to inclose the electric connections for the heating element, which is thereby made detachable from the other parts, to facilitate renewal thereof. Two parallel tubular guide members 5 extend upward from casing 4 and inclose the wires 6 and 7 leading to the heating element.

Slidably mounted on tubular members 5 is a casing 8 containing the thermostatic device, consisting, for example, of a mercurial thermometer, whose bulb 9 projects below the casing 8 so as to be in contact with the water to be heated. A perforated cover 10 screws on the lower end of casing 8 and engages the bulb 9 to hold it against a soft rubber plug 11, closing the lower end of casing 8 and supporting the stem of the thermometer, which extends through said plug. Casing 8 may consist of a tube having cross arms 13 and 13' through which the tubular guide members 5 pass, and one of said cross arms may be provided with split sleeves 21 to resiliently engage said tubular guide members so as to hold the casing 8 in any position to which it may be moved. A contact rod 14 extends within the bore of the thermometer stem so as to make contact, under certain conditions, with the mercury therein, said rod being provided with means for adjustment thereof. For this purpose a rack 15 may be connected to rod 14 by means of an insulating block 14', said rack engaging a pinion 16 on a shaft 17 mounted to turn in bearings in the casing 8. Said shaft extends through to the outside of the casing and is provided with an operating handle or thumb piece 18 and with an indicating pointer 19 which coöperates with a scale means 20 to indicate the adjustment of the device.

Casing 8 may be provided at its upper end with a bayonet joint or other coupling means 29 for connection with a suitable plug on an electric cord 22, said coupling means having for example, three terminals, 45, 46 and 47 for coöperation with plug terminals 48, 49 and 50. Said electric cord consists of twisted wires or cables, similar to the usual lamp cord except that a portion thereof comprises three wires, extending between the plug terminals 48, 49 and 50 and the electromagnetic controlling means. Said electromagnetic controlling means may be inclosed in a case 28, and may comprise an electromagnet 23 whose armature 24 is provided with an arm 25 for engaging a contact spring 26 so as to remove it from a contact spring 27, to break connection between said springs.

The electrical connections, as indicated in Fig. 2, may be as follows:

Two supply wires 30 and 31 are connected to the supply terminals, which may be wall socket terminals, indicated at 32', and said wires may be contained within a casing 33 for protection and convenience. Wire 30 leads to plug terminal 50, and from the corresponding terminal 47 wires 34 and 7 lead respectively to the bottom of the mercury column in the thermometer stem and to one terminal of the heating element 1. Wire 31 is connected by wire 36 to one terminal of electromagnet 23 and by wire 37 to contact spring 26. The other terminal of the electromagnet is connected by wire 38 to plug terminal 49 and the corresponding terminal 46 is connected by wire 39 to contact rod 14, this last connection being flexible to allow rod 14 to move up and down. Contact spring 27 is connected by wire 40 to plug terminal 48 and the corresponding terminal 45 is connected by wire 6 to the other side of the heating element 1.

A suitable supporting means for the apparatus is provided, which may be, as shown, a stand 70 adapted to rest on the bottom of a vessel 41 and to hold the apparatus in an upright position. Vessel 41 may be provided with an outlet 42, and a rubber tube 43 provided with suitable valve means 44 may be attached thereto for drawing off the water from the vessel. Said tube may lead to a douche nozzle or other means for applying or utilizing the heated water.

The operation is as follows:

Vessel 41 is partly filled with water or other liquid and the apparatus is placed therein as shown in Fig. 1. Thumb piece 18 is turned so that pointer 19 indicates upon scale 20 the temperature at which it is desired to maintain the liquid, and the current is turned on, for example, by screwing the plug 32 in a wall socket of an electric light circuit. A current then passes through wire 30, contacts 50 and 47, wire 7, resistance wire of heating element 1, wire 6, contacts 45 and 48, wire 40, contact springs 27 and 26, wire 37, and thence back to the wall socket terminal by wire 31. The current passing through the resistance of the heating element causes it to become heated, thereby heating the water surrounding it until the desired temperature is reached. The adjustment of pointer 19 to indicate this temperature on scale means 20 operates through pinion 16 and rack 15 to so adjust the level of contact rod 14 in relation to the mercury column that when the liquid reaches the desired temperature, said rod will make contact with said mercury column. Part of the current is then allowed to flow through wire 30, contacts 50 and 47, wire 34, the column of mercury in the thermometer stem, contact rod 14, wire 39, contacts 46 and 49, wire 38, electromagnet 23, wire 36, and thence back to the wall socket terminal by wire 31. Electromagnet 23 is thereby energized, attracting armature 24 and thereby causing arm 25 to move contact spring 26 out of contact with contact spring 27, so as to break the current through the heating element 1. Electromagnet 23 remains energized as long as contact rod 14 is in contact with the mercury column in the thermometer, and contact springs 26 and 27 are therefore held out of contact with each other. No further heat is supplied to the body of liquid until it has cooled sufficiently to cause the mercury column to descend far enough to break contact with rod 14, when armature 24 is released by electromagnet 23 due to the breaking of the circuit through said electromagnet. This allows contact spring 26 to spring back into contact with contact spring 27 and the current is again allowed to pass through the heating element as before, and thereby bring the liquid up to the desired temperature again. As it only requires a very slight drop in temperature below the desired temperature to break the contact between the mercury column and the contact rod 14, and as the heating instantly ceases as soon as the desired temperature is reached, the liquid is maintained at practically a constant temperature without further manipulation after the initial adjustment has been made and the current turned on.

The electric heating element and the thermostatic controlling device are both mounted in a single frame means, consisting of the casings 3, 4 and 8 and the guide means 5, so that the said members constitute a portable device which may be removed bodily from the stand 40 and from the water receptacle or vessel 41, and the portable heating device so constituted may be inserted in any other receptacle for heating liquid therein. The electromagnetic circuit controlling means 23, etc., and the electric heating device being connected to one another and to the connecting plug 32 by flexible connecting cords 22 and 33, the heating device may be used anywhere that a supply of current is available. The casing 8 containing the thermostatic circuit controller is, in any case, adjusted by sliding it on the tubular guide members 5 to bring it to proper position in the body of water in the receptacle, say a few inches below the surface, while the heating element is positioned, say, near the bottom of the receptacle.

In the form of the invention shown in Fig. 3, a vessel 51 is provided with a pocket or receiving means 52 having perforations 52', and the outlet 53 is preferably placed near the bottom of this pocket as shown. A casing 54 is adapted to be inserted within this pocket and to contain the heating and thermostatic circuit controlling elements. The heating element 55 is contained within the lower part of said casing 54 and may be held in place by a metal plug 56 and a screw cap 57, said cap screwing on the lower end of casing 54. Plug 56 is provided with openings for the passage of wires 58 and 59 leading to the heating element. A thermometer is placed above the heating element with its bulb 60 resting on plug 56 and its stem 61 extending up through a soft rubber plug 62 so as to make a water tight joint.

The wall of the casing 53 between plugs 56 and 62 is provided with perforations 63 so as to allow the water to come in direct contact with the bulb 60. The arrangement of the circuit controlling and electromagnetic elements is substantially the same as in the form above described, wires 65, 66 and 67 (Fig. 3) corresponding respectively to wires 30, 38 and 40 (Fig. 2), and leading to the electromagnetic circuit breaking means (not shown in Fig. 3). The operation of this form of the invention is substantially the same as above described, except that it does not permit adjustment of the level of the thermostatic controlling element, relative to the heating element.

What I claim is:

1. The combination with a receptacle provided with means for drawing off liquid therefrom, of a thermostatic circuit controlling device within said receptacle, adjustable for control at different temperatures, circuit means controlled by said circuit controlling device and including electromagnetic means, and electric circuit means including a heating element within said receptacle and also including circuit controlling means operated by said electromagnetic means to open the circuit of said heating element when the liquid in the receptacle reaches the temperature for which the thermostatic circuit controlling device is adjusted.

2. An electric water heater comprising an electric heating element provided with a casing, guide means mounted on said casing, an upper casing slidably mounted on said guide means, thermostatic circuit controlling means mounted on said upper casing, and electric circuit means controlled by said thermostatic controlling means for operation of said heating element.

3. A portable water heater comprising an electric heating element provided with a casing, tubular guide members mounted on said casing, an upper casing mounted to slide on said guide members, a thermostatic circuit controller mounted in said upper casing, terminal means carried by said upper casing and electric connections extending from said terminal means into said upper casing for connection with the thermostatic circuit controller and circuit connections extending through said tubular guide members for connection with the heating element.

4. A water heating device comprising an electric heating element, a thermostatic circuit controlling device mounted to move vertically with respect to said heating element, and electric circuit means including said heating element and controlled by said thermostatic controlling device.

5. A portable electric water heater comprising an electric heating element and a thermostatic circuit controlling device, mounted together to constitute a portable appliance, a flexible cable connected to said appliance and comprising wires leading to the heating element and connections for the thermostatic circuit controller, a connecting plug connected to said cable for connection thereof with a supply socket, and an electromagnetic circuit controlling device interposed in said cable intermediate its ends, and connected to the wires thereof.

In testimony whereof I have hereunto set my hand, at Los Angeles, California, this 17th day of June 1916.

IDA R. FORBES.